(12) United States Patent
Choy et al.

(10) Patent No.: US 7,274,534 B1
(45) Date of Patent: Sep. 25, 2007

(54) DISK DRIVE CONFIGURED TO ENABLE NON DESTRUCTIVE LEAK DETECTION AT THE INTERFACE BETWEEN A DRIVE SUB-COMPONENT AND THE DISK DRIVE HOUSING

(75) Inventors: Michael G. Choy, Mountain View, CA (US); John R. Gustafson, Los Gatos, CA (US); Peter G. Robinson, Concord, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 377 days.

(21) Appl. No.: 10/926,249

(22) Filed: Aug. 24, 2004

(51) Int. Cl.
*G11B 33/14* (2006.01)
(52) U.S. Cl. .................................... 360/97.02; 720/648
(58) Field of Classification Search ............. 360/97.02; 720/648
See application file for complete search history.

(56) References Cited

U.S. PATENT DOCUMENTS 6,618,222 B1  9/2003  Watkins et al.

FOREIGN PATENT DOCUMENTS

JP  2002-245771 A  *  8/2002

OTHER PUBLICATIONS

U.S. Appl. No. 10/877,740, filed Jun. 25, 2004, entitled "Disk Drive Having a Disk Drive Component Adhered to the Disk Drive Housing Via an Adhesive Assembly Having a Leveling Layer", Watkins et al.

* cited by examiner

*Primary Examiner*—Julie Anne Watko
(74) *Attorney, Agent, or Firm*—Young Law Firm (57) ABSTRACT

A disk drive includes a disk drive housing having a breather hole and a separate leak testing hole, both the breather hole and the leak testing hole being formed through the disk drive housing, and a drive sub-component attached to a surface of the disk drive housing so as to form an interface between the sub-component and the surface of the housing. The interface defines an interface outer perimeter and a sealed airflow testing channel in fluid communication only with the leak testing hole to enable a non-destructive detection of leaks at the interface. The airflow testing channel may be disposed within the interface outer perimeter.

18 Claims, 5 Drawing Sheets

DISK DRIVE CONFIGURED TO ENABLE NON DESTRUCTIVE LEAK DETECTION AT THE INTERFACE BETWEEN A DRIVE SUB-COMPONENT AND THE DISK DRIVE HOUSING

BACKGROUND OF THE INVENTION

1. Field of the Invention

The present invention relates to disk drives. More particularly, the present invention relates to breather filters and to leak testing drives equipped with such breather filters.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA) having an actuator assembly having at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

Commonly assigned U.S. Pat. No. 6,618,222 and (which is incorporated herein by reference in its entirety) discloses a breather filter that is effective to both reduce the effects of airflow generated within the disk drive due to rotation of the disks and to regulate and filter the airflow entering the drive. In particular, the breather filter disclosed therein includes a shroud that reduces turbulent airflow within the drive at and near the outer edge of the disk or disks, which turbulent airflow is believed to at least contribute to the cause of a number of problems. Such problems include, for example, an unwanted resonance response of and force on the actuator assembly, an increase in the percent off track values of the associated head, and disk flutter (vibrations induced on the disk or disks). The breather filter also filters airflow entering the disk drive for undesirable particulates and chemical compounds and regulates the humidity within the drive.

The breather filter described in the above-identified patent fits within the disk drive housing and may be attached to one of the surfaces of the disk drive housing (such as the disk drive cover, for example) by means of adhesive. In particular, the breather filter includes a surface that is configured for attachment to the disk drive cover. This surface of the breather filter is not (and cannot be made to be) perfectly flat. This surface, if examined microscopically, may be seen to have a certain roughness, which may be quantified as local differences in elevation (e.g., peaks and valleys) relative to a reference plane. In turn, the surface of the disk drive cover to which the breather filter is to be attached is not perfectly flat either. Indeed, this surface of the disk drive cover also has a certain roughness which, under sufficient magnification, may also be quantified as local differences in elevation relative to a reference plane.

When attaching the breather filter to the surface of the disk drive cover with adhesive, what is attempted is to adhesively mate two uneven surfaces. When the breather filter is attached to the surface of the disk drive cover, the breather filter is pressed against the disk drive cover, with a layer of adhesive between the two elements. Initially, therefore, the layer of adhesive between the disk drive cover and the breather filter is in compression. Afterwards, when the force applied to the elements is removed, the adhesive layer is in tension, causing a force on adhesive layer that tends to separate the breather filter from the disk drive housing cover. The roughness of the breather filter and that of the disk drive cover only exacerbate this tendency of the breather filter to separate from the disk drive cover because the adhesive cannot make good contact with the rough and uneven surfaces. Increasing the thickness of the adhesive layer does not solve this problem. This tendency to separate may reveal itself as an improper seal between the breather filter and the disk drive housing cover. In turn, such an improper seal reduces the effectiveness of the breather filter's ability to control humidity and filter particulates, with consequent undesirable effects upon the operation and reliability of the drive. Co-pending and commonly assigned U.S. patent application Ser. No. 10/877,740 filed on Jun. 25, 2004 addresses this issue by providing, according to one embodiment thereof, a leveling layer formed of a closed cell foam material sandwiched between two layers of adhesive. The free surface of one of the adhesive layers adheres to the drive housing and the free surface of the other adhesive layer adheres to the breather filter. This structure compensates for the uneven surface roughness of the surfaces of the breather filter and of the drive housing and improves the quality of the seal between the breather filter and the drive housing.

Such an improved seal between the breather filter and the disk drive housing does not, however, obviate the need for drive level leak testing of this interface. Current methods for measuring leaks between the breather filter and the housing tend to compromise the seal and create rework and scrap, for the reasons detailed hereunder. Canister-type breather filters have a single inlet air path. Current methods for measuring airflow leaks at the interface between the breather filter and the housing include sealing off this inlet air path with an airtight external pad. The pad is pressed against the filter to render the breather filter air tight. With the breather filter sealed, a leak tester can pressurize the assembly and test the interface for leaks. One of the disadvantages of this method is that the placement of the external pad exerts a force on the breather filter, which may change the seal characteristics of the breather filter-drive housing interface, rendering an accurate measurement of leaks difficult.

Pouch filters are another type of breather filters. Pouch-type breather filters also have a single inlet for air entering the drive. Current methods for testing such pouch-type breather filters usually call for placing a non-functional dummy pouch-type breather filter on the drive housing, in place of the functional pouch-type breather filter. Such dummy breather filters are similar to their fully functional counterparts, except that they do not include any inlet air path. After such a dummy breather filter is installed on the drive housing, the air inlet may be pressurized and the air-tightness of the interface tested. The drawback to this approach is that the dummy breather filter is not a real component and the filter/housing assembly must be re-worked and the dummy filter scrapped, further increasing the manufacturing costs. Further adding to the costs of such testing is the cost of keeping track of such non-functional components and of insuring that such components do not enter the production line.

From the foregoing, it is apparent that improved disk drives that do not require the use of such non-functional components or such destructive leak testing methods are needed. Such improved disk drives should be configured such that the integrity of the seal between breather filter and the disk drive housing may be accurately tested in a non-destructive fashion.

SUMMARY OF THE INVENTION

According to an embodiment thereof, the present invention is a disk drive that includes a disk drive housing having a breather hole and a separate leak testing hole, both the breather hole and the leak testing hole being formed through the disk drive housing, and a drive sub-component attached to a surface of the disk drive housing so as to form an interface between the sub-component and the surface of the housing. The interface defines an interface outer perimeter and a sealed airflow testing channel in fluid communication only with the leak testing hole to enable a non-destructive detection of leaks at the interface. The airflow testing channel being may be disposed within the interface outer perimeter.

At least a portion of the airflow testing channel may be defined within the surface of the drive sub-component that is attached to the disk drive housing. A layer of adhesive may be disposed between the drive sub-component and the surface of the disk drive housing. At least a portion of the airflow testing channel may be defined by the layer of adhesive. At least a portion of the airflow testing channel may be defined within the surface of the housing. At least one fastener may be configured to attach the drive sub-component to the surface of the disk drive housing and the airflow testing channel may be disposed at least partially around the fastener. The fastener may include a screw. The disk drive housing may includes a base and a cover and the airflow testing channel may be at least partially defined within the base. The disk drive housing may include a base and a cover and the airflow testing channel may be at least partially defined within the cover. The drive sub-component may be a breather filter that is configured to limit and filter airflow into the disk drive housing, the breather filter including a surface that defines a filter hole that is in fluid communication with the breather hole so as to form a sealed and delimited filter airflow pathway. The leak testing channel may be disposed at least partially around the filter airflow pathway. The drive sub-component may be, for example, a breather filter that is configured to limit and filter airflow into the disk drive housing through a filter airflow pathway, the breather filter including a breather filter housing and a filter fitted within the filter housing, the breather filter housing having a breather filter housing surface that defines a filter housing hole that is in fluid communication with both the filter airflow pathway and the breather hole. The airflow testing channel may be defined at least partially within the breather filter housing and may at least partially around the filter housing hole. A carrier layer defining a first carrier layer surface and a second carrier layer surface may also be provided. A first adhesive layer may be configured to adhere the second carrier layer surface to the disk drive housing to form the interface between the breather filter and the disk drive housing, and a second adhesive layer may be configured to adhere the breather filter housing surface to the first carrier layer surface. The carrier layer and the first and second adhesive layers may be formed such as to define a portion of the filter airflow pathway. The drive sub-component may, for example, be a breather filter, a spindle motor, an actuator assembly or a voice coil motor back plate. The airflow testing channel may form a closed pathway around the filter airflow pathway.

DESCRIPTION OF THE PREFERRED EMBODIMENTS

Figure 1:
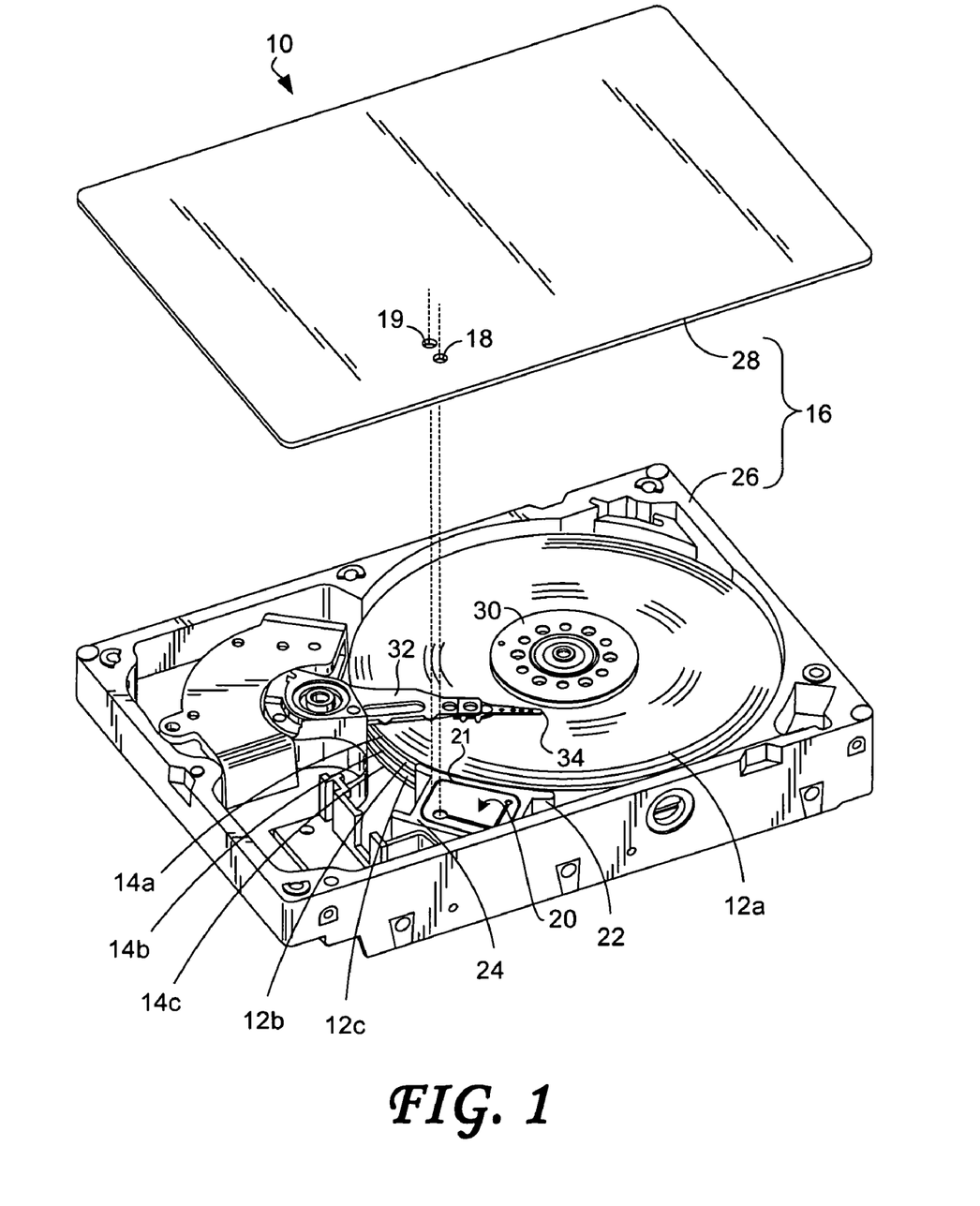
FIG. 1 is a perspective view of a disk drive configured for non-destructive detection of leaks at the interface of between the breather filter and the housing, according to an embodiment of the present invention.

The drawings illustrate aspects of a disk drive and sub-components thereof, according to embodiments of the present invention. FIG. 1 shows a disk drive 10 constructed in accordance with an embodiment of the present invention. The disk drive 10 includes at least one rotatable disk 12 (individually denoted 12a-c). The disks 12a-c respectively include disk edges 14a-c. The disk drive 10 further includes a disk drive housing 16 having a breather hole 18 formed through the disk drive housing 16. The disk drive 10 further includes a breather filter 20 in mechanical communication with the disk drive housing 16. The breather filter 20 may include a shroud portion 22 positioned adjacent the disk edges 14a-c. The shroud portion 22 may be formed to extend along the disk edges 14a-c for mitigating airflow adjacent the disks 12a-c. The breather filter 20 further includes a breather filter housing portion 24 integrated with the shroud portion 22. The breather filter housing portion 24 is disposed adjacent the breather hole 18 for filtering airflow through the breather hole 18. The breather filter housing portion 24 is positioned with the shroud portion 22 between the breather filter housing portion 24 and the disk edges 14a-c and mitigates airflow from the breather hole 18 to adjacent to the disks 12a-c.

In further detail, the disk drive housing 16 includes a disk drive base 26 and a disk drive cover 28 that cooperatively house the remainder of the components of the disk drive 10. As shown in FIG. 1, the breather hole 18 may be defined through the disk drive cover 28. The disk drive 10 includes a spindle motor hub (not shown) rotatably attached to the disk drive base 26. The disks 12a-c are stack-mounted upon the hub, and a disk clamp 30 may be used to secure the disks 12a-c to the hub. The disk drive 10 further includes a head stack assembly 32 rotatably attached to the disk drive base 26 in operable communication with the disks 12a-c. The head stack assembly 32 includes transducer heads 34 (only one being visible in FIG. 1). The head stack assembly 32 is configured to pivot relative to the disk 12a-c for reading data from and writing data to the disks 12a-c.

Referring now to FIGS. 2-5B, the breather filter housing portion 24 may include a surface 54 that defines an elongate passageway 36 having a passageway inlet 38 extending to a passageway outlet 40. The passageway inlet 38 is disposed in fluid communication with the breather hole 18. The passageway 36 may be configured as a diffusion path, for regulating humidity and temperature within the disk drive 10, as well as a labyrinth path for removing particulates from airflow through the breather hole 18. The passageway 36 may be delimited by the surface 54 of the breather filter housing portion and the disk drive housing 16, preferably the disk drive cover 28 of the disk drive housing 16. The breather filter housing portion 24 includes an inner cavity 44, and the passageway outlet 40 extends to the inner cavity 44.

Figures 4, 5A, 5B:
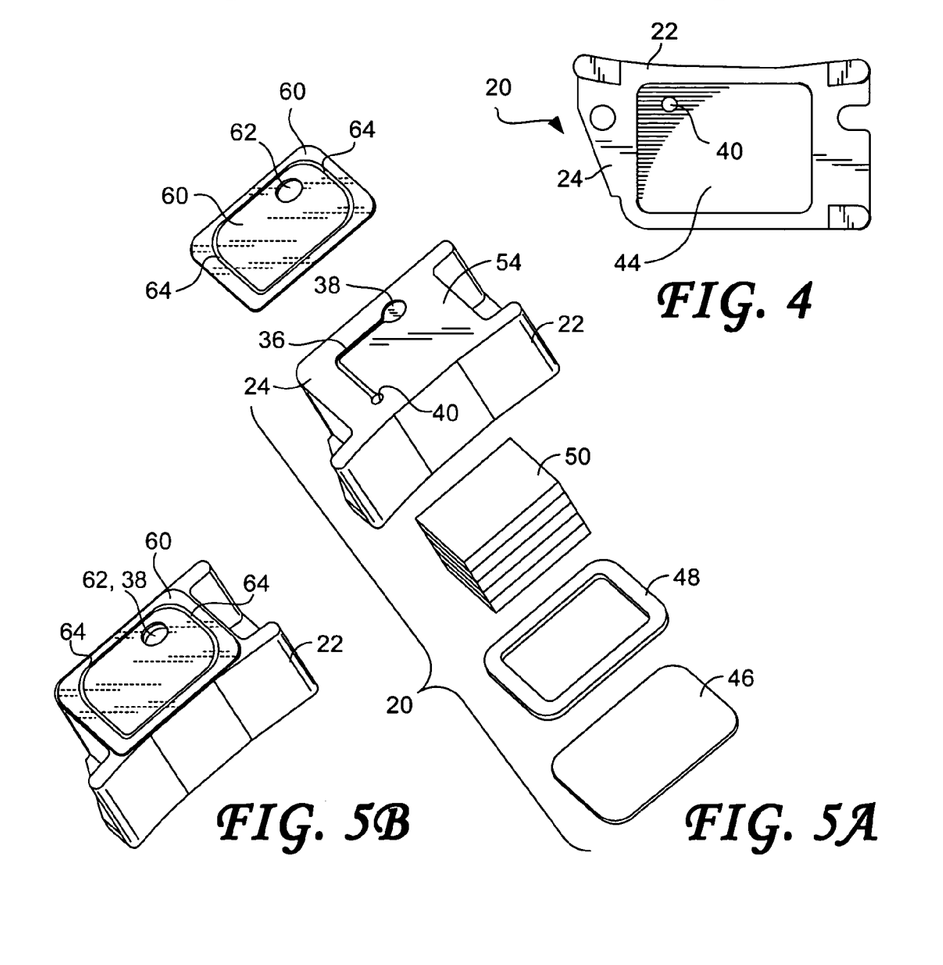
FIG. 4 is a bottom view of the breather filter of FIG. 2 showing a layer of adhesive according to an embodiment of the present invention.
FIG. 5A is an exploded perspective view of the breather filter of FIGS. 2-4 and of the first adhesive layer.
FIG. 5B is a perspective view of the breather filter of FIG. 5A, showing the first adhesive layer applied thereon.

Referring now to FIG. 5A, the breather filter housing portion 24 may further include a particulate filter 46 extending across the inner cavity 44 for filtering particulates from airflow through the breather hole 18. An adhesive gasket 48 may be provided for attaching the particulate filter 46 to the breather filter housing portion 24. The breather filter housing portion 24 may also include a chemical compound filter 50 disposed within the inner cavity 44 for removing chemical compounds from the air entering through the breather hole 18. The chemical compound filter 50 may be a chemical trap, such as potassium carbonate or sacrificial metals, such as copper or silver. Further, the chemical compound filter 50 may be an adsorbent. The adsorbent may be a desiccant such as silica gel, clay or carbon, for example. Further, usage of carbon is contemplated to advantageously remove organics. A first layer of adhesive 60 may applied to the surface 54 of the breather filter 20 to adhere the breather filter 20 to the housing 16 of the disk drive so as to form an interface between the breather filter and the drive. This interface, together with the passageway 36, the passageway inlet 38 and the passageway outlet 40, forms a sealed and delimited airflow pathway into the housing 16 that is in fluid communication with the breather hole 18 formed through the housing 16. To permit airflow to the passageway inlet, the first adhesive layer 60 may define an opening 62 that is aligned with the passageway inlet 38. FIG. 5B shows the breather filter 20 with the first adhesive layer 60 applied to the surface 54 thereof.

Figure 6:
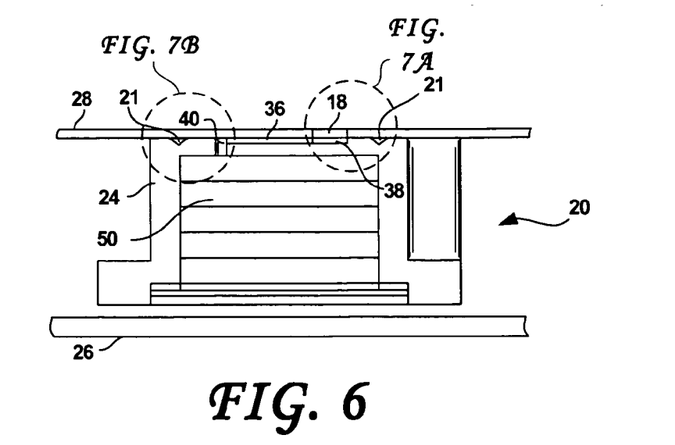
FIG. 6 shows the manner in which the breather filter may be attached to the disk drive housing, according to an embodiment of the present invention.
Figure 7A:
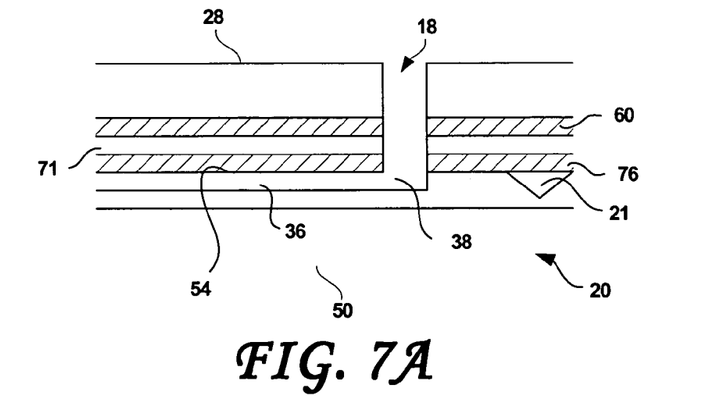
FIG. 7A is a first detail view of a portion of FIG. 6, illustrating the manner in which the leveling layer and the first and second adhesive layers adhere the breather filter to the disk drive housing, according to an embodiment of the present invention.
Figure 7B:
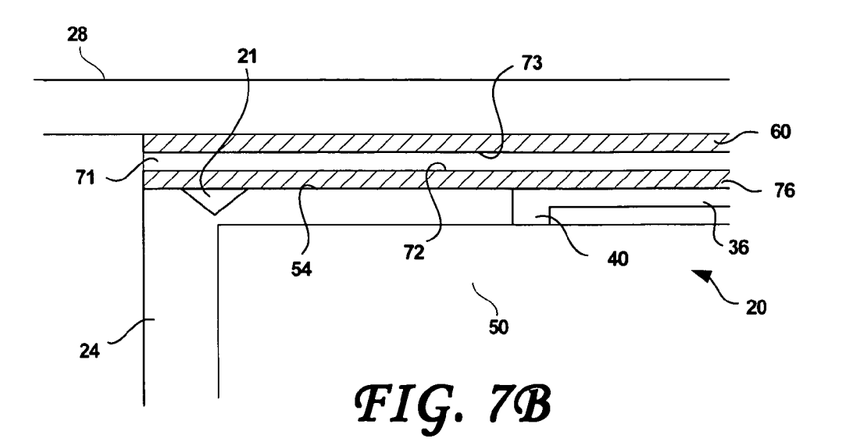
FIG. 7B is a second detail view of a portion of FIG. 6, illustrating the manner in which the leveling layer and the first and second adhesive layers adhere the breather filter to the disk drive housing, according to an embodiment of the present invention.

FIG. 6 shows the manner in which the breather filter 20 may be attached to the disk the cover 28 of the drive housing 16, according to an embodiment of the present invention. FIGS. 7A and 7B are detail views of a portion of FIG. 6, illustrating further aspects of the interface between the cover 28 and the breather filter. In this embodiment, the breather filter is adhered to the cover 28 of the housing 16, although the breather filter may also be adhered to the base 26. The breather filter may be adhered, via the first adhesive layer 60, to the cover 28 such that the passageway inlet 38 is in fluid communication (e.g., aligned) with the breather hole 18 formed in the cover 28. In this manner, the interface between the breather filter 20 and the cover 28 forms a delimited and sealed filter airflow pathway into the drive housing 16. FIG. 7A shows a portion of FIG. 6 in greater detail, according to an embodiment of the present invention. As shown, the disk drive may also include a carrier layer 71 and a second adhesive layer 76 between the surface 54 of the breather filter 20 and the cover 28 (or the base 26) of the housing 16 of the disk drive. The carrier layer 71 may be formed of, for example, a polymer such as polyethylene terephthalate (PET). The carrier layer may also include or be formed of a closed cell foam such as the leveling layer disclosed in the commonly assigned patent application Ser. No. 10/877,740 identified above. Specifically, the carrier layer 71 defines a first carrier layer surface 72 and a second carrier layer surface 73. As shown, the second adhesive layer 76 is configured to adhere the breather filter housing surface 54 to the first carrier layer surface 72, and the first adhesive layer is configured to adhere the second carrier layer surface 73 to the disk drive housing 16 (in the embodiment illustrated, to the cover 28). The carrier layer 71 and the second adhesive layer may each be configured to define openings that are aligned with the opening 62 defined in the first adhesive layer 60, to enable air to reach the passageway inlet 38 of the breather filter 20. In this manner, the carrier layer 71 and the first and second adhesive layers 60, 76 collectively form an interface between the breather filter 20 and the cover 28 (or the base 26).

As shown in FIGS. 6, 7A and 7B, the interface allows air to enter the drive housing 16 through a filter airflow pathway that includes the breather hole 18 defined in the housing 16 (e.g., the cover 28), the opening 62 defined within the first adhesive layer 60, the aligned openings defined within the carrier layer 71 and the second adhesive layer and through the passageway inlet 38. The air admitted to the filter airflow pathway then travels within the elongate passageway 36 defined within he surface 54 of the breather filter 20 and sealed by the second adhesive layer 76 (or by the first adhesive layer 60 in the case wherein the carrier layer 71 and the second adhesive layer 76 are not used), and into passageway outlet 40. This air is then filtered by the compound filter 50 and the particulate filter 46 within the breather filter housing portion 24 before reaching the interior of the disk drive housing 16 and the head disk assembly enclosed thereby.

The interface between the surface 54 of the breather filter 20 and the housing 16 of the disk drive may include the first adhesive layer 60 (and optionally the carrier layer 71 and the second adhesive layer 7 also). The purpose of leak testing this interface is to test and insure that the seal between the housing 16 and the breather filter 20 is such that all (or substantially all, within pre-established design parameters) of the air that enters the drive does so through the breather filter's compound and particulate filters 50, 46, and not through an insufficiently sealed interface that allows air to bypass the filters. To enable the stated goal of non-destructive testing of the this interface, embodiments of the present invention call for a sealed airflow testing channel in fluid communication with a filter leak testing hole defined within the housing 16. Such a filter leak testing hole is shown in FIG. 1 at reference numeral 19. The airflow testing channel may be disposed at least partially around the filter airflow pathway defined by the breather hole 18, the opening 62 defined within the first adhesive layer 60, and optionally the aligned openings defined within the carrier layer 71 and the second adhesive layer and by the passageway inlet 38. If leak testing reveals no or substantially no airflow within the airflow testing channel disposed around (or partially around) the filter airflow pathway, it may be surmised that the interface is properly sealed and that the only path for air entering the drive housing is though the filter airflow pathway and through the filters 50, 46. In other words, if the adhesive around the filter airflow pathway does not allow airflow, it may be concluded that a seal of sufficient quality has been created at the interface between the breather filter 20 and the housing 16 and that the filter airflow pathway is the only air inlet to the drive, within specified design tolerances.

The sealed airflow testing channel may be formed, disposed or defined most anywhere within the housing 16, the breather filter 20 and/or the interface therebetween. In the embodiment illustrated in FIG. 1, the airflow testing channel is shown at reference numeral 21 defined within the breather filter 20, in a closed loop around the passageway inlet 38 defined within the surface 54 of the breather filter as shown, for example, in FIG. 2. Such an airflow testing channel 21 may be advantageously formed by the same process (e.g., injection molding process) that formed the breather filter housing portion 24. The airflow testing channel 21 and the leak testing hole 19 are configured such that they are in fluid communication. The first adhesive layer 60 (and optionally the carrier layer 71 and the second adhesive layer 76) may be disposed between the housing 16 and the breather filter 20 in the manner described above, so as to seal the airflow testing channel 21. The adhesive layer(s) and the carrier layer 71 may be formed over the airflow testing channel 21 or may be configured such that they define a cutout in the shape of the airflow testing channel that is disposed directly over the airflow testing channel 21. However, as the adhesive layer(s) are very thin (on the order of 1/1000 inch, for example) and highly viscous, the adhesive layer(s) do not flow into the airflow testing channel 21. In the event that the airflow testing channel is somehow blocked by adhesive or by some other obstruction, the functionality of the airflow testing channel 21 (as well as other embodiments of airflow testing channel discussed hereunder) is only marginally diminished, as the integrity of the seal cannot be assured only at the point of the obstruction. The airflow testing channel need not have the racetrack appearance shown in FIGS. 1-3, as it need only be disposed around (or partially around) the filter airflow pathway (i.e., around the breather hole 18) and openings aligned therewith.

Figure 2:
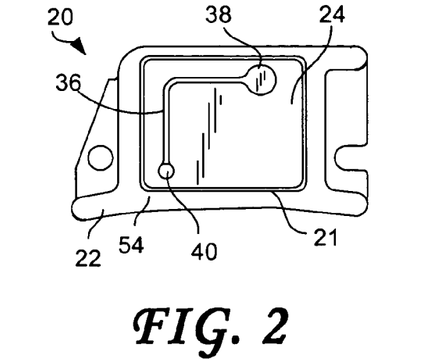
FIG. 2 is a top view of a canister-type breather filter with which embodiments of the present invention may be practiced.
Figure 3:
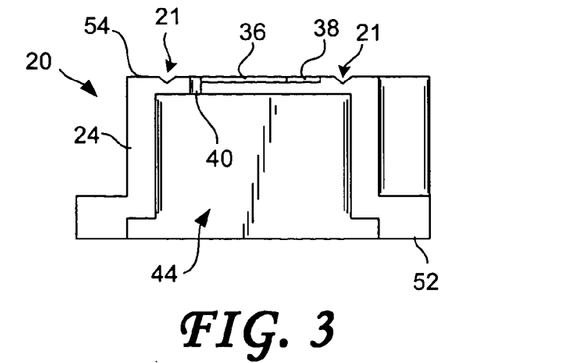
FIG. 3 is a cross-sectional view of the breather filter of FIG. 2.

Instead of being defined within the housing portion 24 of the breather filter as shown at 21 in FIGS. 1-3, the airflow testing channel may be defined by the first adhesive layer 60 (and optionally the carrier layer 71 and the second adhesive layer 76), as shown at reference numeral 64 in FIGS. 5A and 5B. In this manner, the adhesive layer 60 is applied to the surface 54 of the breather filter 20 so as to form, by its localized absence, the airflow testing channel 64. In this manner, the airflow testing channel 64 may be characterized as a localized adhesive-free zone. That is, the airflow testing channel 64 may be formed by locally omitting the adhesive layer 60. Thereafter, when the adhesive layer 60 is adhered to the cover 28 (or the base 26), the airflow testing channel is sealed and is functional to allow non-destructive leak testing of the interface between the breather filter 20 and the housing 16.

Figure 10A:
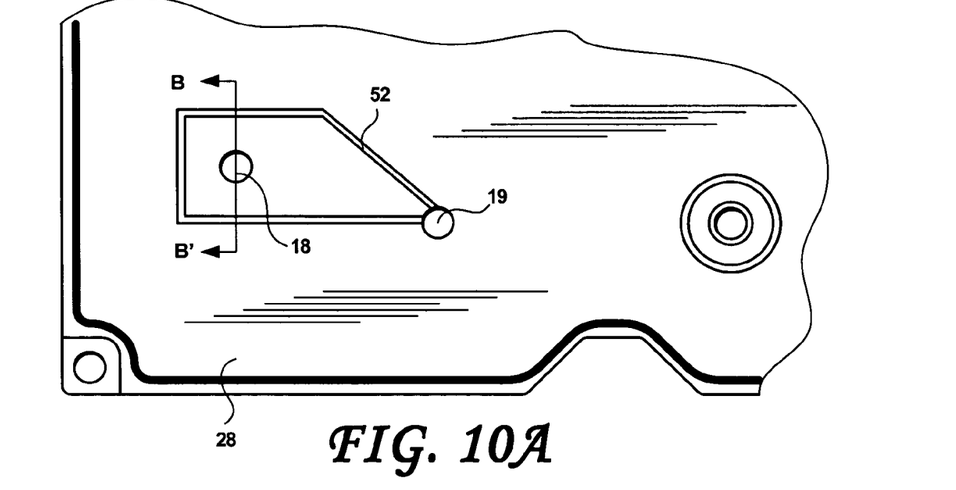
FIG. 10A is a detail of a portion of the disk drive housing (e.g., a portion of the base or cover) showing the airflow testing channel disposed around the breather hole, according to another embodiment of the present invention.
Figure 10B:
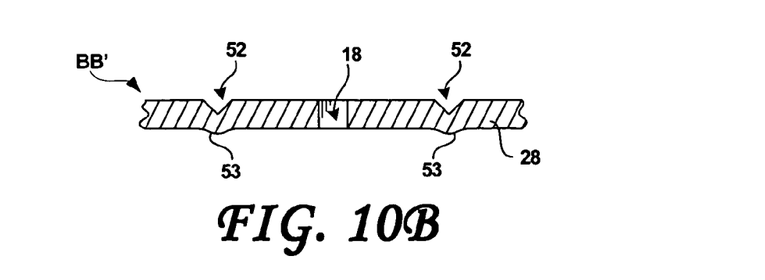
FIG. 10B is a cross-sectional detail of a portion of the disk drive housing of FIG. 10A, taken along cross-sectional BB".

Similarly, instead of being defined within the housing portion 24 of the breather filter (FIGS. 1-3) or the first adhesive layer 60 (and optionally the carrier layer 71 and the second adhesive layer 76), the airflow testing channel may be defined within the housing 16, such as within the cover 28 or the base 26. FIG. 10A shows a portion of a representative cover 28 in which an airflow testing channel has been formed, it being understood that the base 26 may be similarly processed to form a similar airflow testing channel. In FIG. 10A, the airflow testing channel is shown at reference numeral 52. The airflow testing channel 52 is formed within the surface of the cover that faces the interior of the housing 16, i.e., the surface of the cover 28 that is not visible when the cover 28 is mated to its base 26. As foreshadowed above, the airflow testing channel 52 need not be formed in a circular, elliptical or racetrack shape. The airflow testing channel 52 shown in FIG. 10A is of an irregular shape that traces a path around the breather hole 18. The leak testing hole 19 formed through the cover 28 is in fluid communication with the airflow testing channel 52. As the airflow testing channel 52 forms a closed loop around the breather hole 18, if no airflow is detected within the airflow testing channel 52, it may be surmised with a great degree of confidence that the airflow inlet formed by the breather hole 18 and aligned openings to the breather filter and its constituent filters 50, 46 represent the only pathway air may take to enter the disk drive housing. The airflow testing channel 52 may be formed within the housing 16 by any of the material forming methods known to those of skill in this art. According to one embodiment of the present invention, the airflow testing channel 52 may be formed within the cover 28 by etching or by means of a so-called kiss-cut, in which a sharp edge is pressed into the material of the cover 28, locally displacing material so as to form the airflow testing channel 52. This may cause a more or less visible corresponding bulge to appear on the opposing facing surface of the cover 28, as shown at 53 in the cross-sectional view of FIG. 10B taken along line BB' of FIG. 10A. Stamping or punching processes may also form the requisite patterns within the housing 16.

Figure 8:
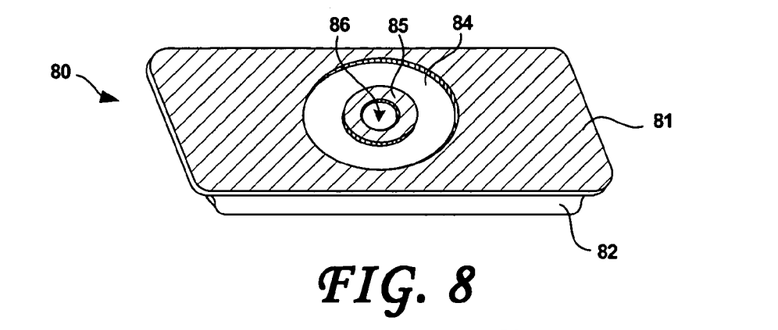
FIG. 8 is a perspective view of a pouch-type breather filter, according to an embodiment of the present invention.
Figure 9:
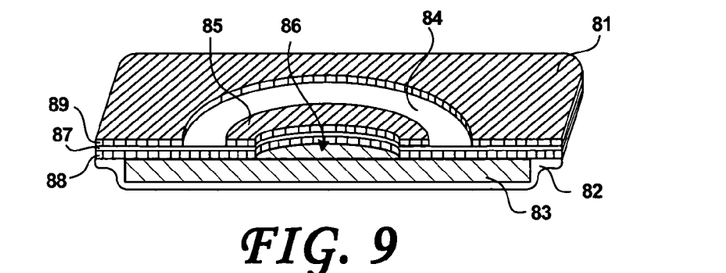
FIG. 9 is a cross sectional view of a pouch-type breather, according to an embodiment of the present invention.

Embodiments of the present invention are not limited to the use of canister-type breather filters. Indeed, the embodiments of the present invention may also be used in conjunction with pouch-type breather filters, as shown in FIGS. 8 and 9. Considering now FIGS. 8 and 9 collectively, a pouch-type breather filter 80 may include a pouch filter 82 that contains one or more compound and/or particulate filters 83. A surface 81 of the pouch-type breather filter 80 defines a sealed and delimited filter airflow pathway 86 that is configured for alignment with the breather hole formed through the housing 16 of the disk drive. The filter airflow pathway 86 allows air to enter the housing 16 through the filter(s) 83. As shown in FIGS. 8 and 9, the surfaces 81 and 85 collectively form a closed leak testing channel 84 that is disposed around the filter airflow pathway 86. The testing hole 19 within the housing 16 (shown in the cover 28 in FIG. 1) is in fluid communication with this leak testing channel 84, so as to allow non-destructive leak testing of the interface between the pouch-type breather filter 80 and the housing 16. The leak testing channel 84 may be formed within the material of the surface 81 of the pouch-type breather filter 80 and/or may be formed by the first adhesive layer that adheres the pouch-type breather filter 80 to the housing 16. As shown specifically in FIG. 9, the pouch-type breather filter 80 may include a laminate structure that includes a second adhesive layer 88, a carrier layer 87, and the first adhesive layer 89. By monitoring the testing hole 19, it may be ascertained whether any airflow is present within the leak testing channel 84. If none is found, it may be concluded that the interface between the pouch-type breather filter 20 and the housing 16 is well sealed and that all of the air entering the housing 16 does so only through the filter airflow pathway 86. The filter airflow pathway 86 and the leak testing channel 84 may be formed by the first adhesive layer 89 and/or by the top layer of the pouch-type breather filter, to which a layer of adhesive is applied to adhere the pouch-type breather filter 20 the housing 16.

Embodiments of the present invention allow for a non-destructive breather filter to housing leak testing. That is, after such non-destructive leak testing, the drive may be returned to the production line without any re-work related to leak testing and without generating scrap leak testing components, as is the case when dummy non-functional breather filters are used to leak test the interface. Such leak testing may be done in line, and both drive-level testing and breather filter testing may be carried out at a single station, thereby further reducing manufacturing costs.

Embodiments of the present invention find utility beyond leak testing the interface between the breather filter and housing. Indeed, aspects and embodiments of the present invention may be utilized to enable non-destructive leak testing of the interfaces between any number of disk drive sub-components and the drive housing. A non-exhaustive list of such drive sub-components includes the spindle motor, the actuator assembly, the voice coil motor (VCM) back plates and the PCB connector that electrically connects the PCB to the HSA. Each of the above-listed exemplary sub-components may be attached to the housing and may potentially be the source of undesirable airflows at their respective interfaces with the housing 16—most often, with the base of the housing 16.

Figure 11:
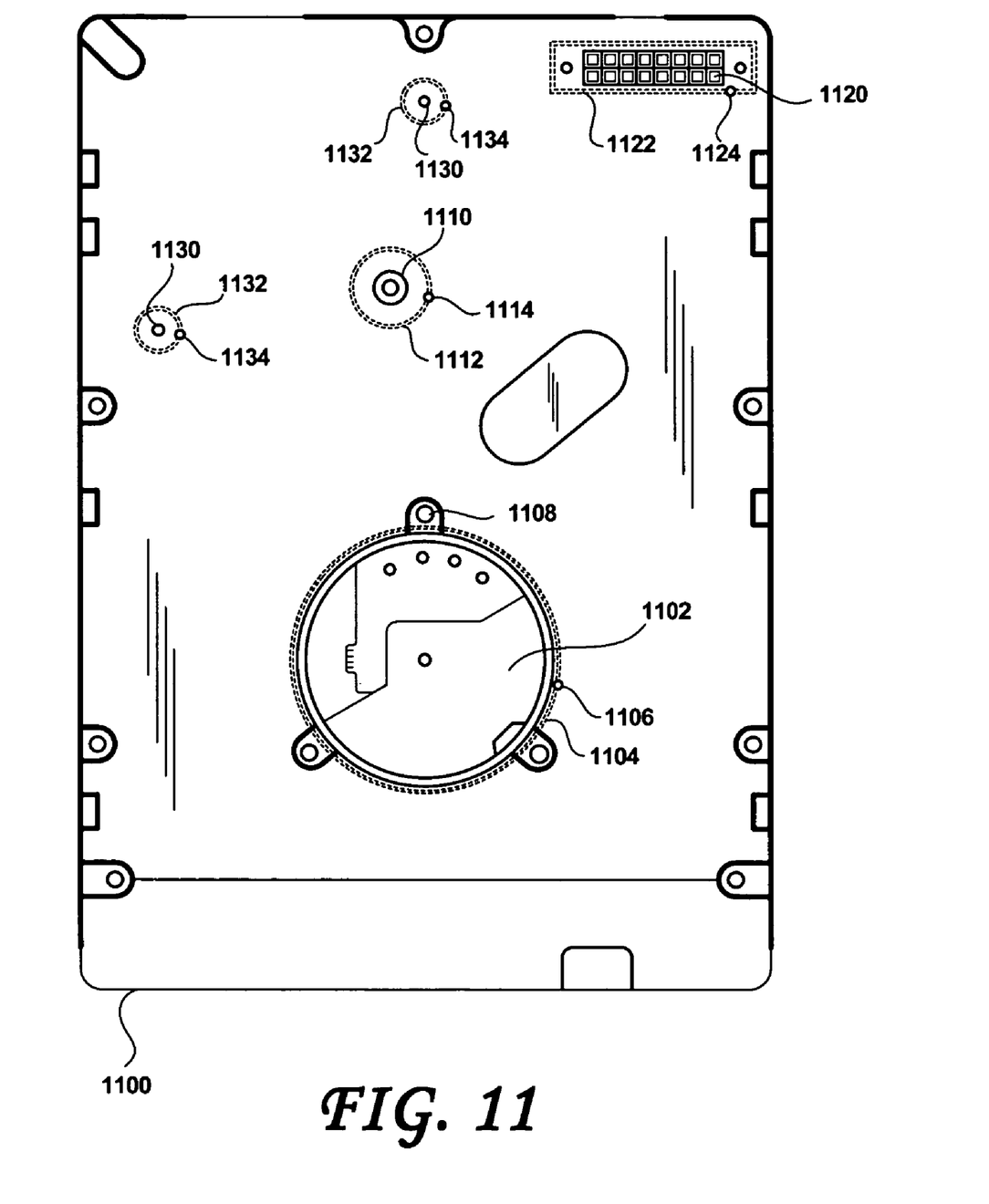
FIG. 11 is a plan view of a base of a disk drive, showing the surface thereof that faces the drive's printed circuit board (PCB).

FIG. 11 is a plan view of a base of a disk drive, showing the surface thereof that faces the drive's printed circuit board (PCB), illustrating further embodiments of the present invention. FIG. 11, showing the underside of the base 1100. The drive sub-components that are represented (i.e., shown in part or whose attachment screws are partially visible) in FIG. 11 include the spindle motor 1102, the HSA 1110, the PCB connector 1120 and the VCM back plate 1130. Apart from the spindle motor, a portion of which is directly visible in FIG. 11, the remaining sub-components cannot be seen in FIG. 11. Of these sub-components, all that is visible are the screws or other attachment means securing them through respective holes defined in the base 1100. Whether visible or not in FIG. 11, each of these sub-components is attached to the base 1100 of the housing through one or more holes defined through the base. The interface between each of these sub-components, therefore, represents a potential airflow leak path. To enable non-destructive leak testing of these interfaces, one or more leak testing channels may be defined within one or a combination of:

the interior surface of the base 1100 (in a manner similar to that shown in FIG. 10A;

the surface of the sub-component that faces and attaches to the interior surface of the base 1100 (in a manner similar to that shown in FIGS. 2 and 3 relative to the breather filter 20);

an adhesive layer configured to adhere the sub-component to the interior surface of the base 1100 (in a manner similar to the adhesive layer 60 shown relative to FIG. 5), and a combination of a carrier layer and one or more adhesive layers (in a manner similar to that illustrated in FIG. 9) configured to adhere the sub-component to the interior surface of the base 1100.

In FIG. 11, each of the sub-components 1102, 1110 and 1120 has been provided with a leak testing channel, and sub-component 1130 has been provided with two such leak testing channels. In practice, however, not all of these sub-components may be provided with such leak testing channel(s). Alternatively, more leak testing channels may be provided within the base 1100 and/or within the sub-components themselves and/or within the means for attaching them to the base 1100. As shown in FIG. 11, a leak testing channel 1104 is provided around the opening for the spindle motor 1102. A leak testing hole 1106 may also be provided through the exterior surface of the base 1100, the leak testing hole being in fluid communication with the leak testing hole 1106. As above, if no airflow is detected within the leak test channel 1104 through the leak testing hole 1106, it may be surmised that the spindle motor is well sealed to the base 1100. The screw bosses 1108 of the spindle motor 1102 may be blind holes and the leak testing channel 1104 may be disposed as shown in FIG. 11. If, however, the screw bosses are through bores (i.e., go all of the way through the base 1100), then the leak testing channel 1104 may be disposed so as to encompass these screw bosses (i.e., the leak testing channel 1104 may be defined so as to have a greater diameter to enable leak testing of the interface surrounding these screw bosses).

Similarly, a leak testing channel 1112 may be provided around the hole (or post) through or to which the HSA 1110 is attached to the base 1100. A leak testing hole 1114 may also be provided through the base 1100, the leak testing hole 1114 being in fluid communication with the leak testing channel 1112. Such leak testing channel 1112 and leak testing hole 1114 may be similarly used to test the air tightness of the interface between the base 1100 and the HSA. The seal between the base 1100 and the PCB connector 1120 is yet another potential source of unwanted airflow. Therefore, a leak testing channel 1122 and a leak testing hole 1124 in fluid communication therewith, may be provided, to enable a non-destructive testing of the seal formed between the PCB connector 1120 and the base 1100. Lastly, the back plates 1130 that support the magnets of the VCM may also be attached to the base 1100, via holes provided through the base 1100. These holes represent another potential source of leaks. Each of these holes may, therefore, be circumscribed by a leak testing channel, as shown in FIG. 11 at reference numeral 1132. Leak testing holes 1134 may also be provided, in fluid communication with the leak testing channels 1132.

Sub-components other than those shown in FIG. 11 may be similarly provided with such leak testing channels and holes. Other disk drive sub-components that are attachable to the cover of the housing 16 and/or to other surfaces of the housing may be similarly equipped with leak testing channels and leak testing holes, as those of skill in this art may appreciate.

What is claimed is:

1. A disk drive, comprising:
   a disk drive housing having a breather hole and a separate leak testing hole, both the breather hole and the leak testing hole being formed through the disk drive housing;
   a drive sub-component attached to a surface of the disk drive housing so as to form an interface between the sub-component and the surface of the housing, the interface defining an interface outer perimeter, the interface further defining a sealed airflow testing channel in fluid communication only with the leak testing hole to enable a non-destructive detection of leaks at the interface, the airflow testing channel being disposed within the interface outer perimeter, and a screw attaching the drive sub-component to the surface of the disk drive housing, the airflow testing channel being disposed at least partially around the screw.

2. The disk drive of claim 1, wherein at least a portion of the airflow testing channel is defined within a surface of the drive sub-component that is attached to the disk drive housing.

3. The disk drive of claim 1, further including a layer of adhesive between the drive sub-component and the surface of the disk drive housing, at least a portion of the airflow testing channel being defined by the layer of adhesive.

4. The disk drive of claim 1, wherein at least a portion of the airflow testing channel is defined within the surface of the housing.

5. The disk drive of claim 4, wherein the disk drive housing includes a base and a cover and wherein the airflow testing channel is at least partially defined within the base.

6. The disk drive of claim 4, wherein the disk drive housing includes a base and a cover and wherein the airflow testing channel is at least partially defined within the cover.

7. The disk drive of claim 1, wherein the drive sub-component is a breather filter that is configured to limit and filter airflow into the disk drive housing, the breather filter including a surface that defines a filter hole that is in fluid communication with the breather hole so as to form a sealed and delimited filter airflow pathway, the leak testing channel being disposed at least partially around the filter airflow pathway.

8. The disk drive of claim 7, wherein the airflow testing channel forms a closed pathway around the filter airflow pathway.

9. The disk drive of claim 1, wherein the drive sub-component is a breather filter that is configured to limit and filter airflow into the disk drive housing through a filter airflow pathway, the breather filter including a breather filter housing and a filter fitted within the filter housing, the breather filter housing having a breather filter housing surface that defines a filter housing hole that is in fluid communication with both the filter airflow pathway and the breather hole and wherein the airflow testing channel is defined at least partially within the breather filter housing and at least partially around the filter housing hole.

10. The disk drive of claim 9, further including:
a carrier layer defining a first carrier layer surface and a second carrier layer surface;
a first adhesive layer configured to adhere the second carrier layer surface to the disk drive housing to form the interface between the breather filter and the disk drive housing, and
a second adhesive layer configured to adhere the breather filter housing surface to the first carrier layer surface, the carrier layer and the first and second adhesive layers being formed such as to define a portion of the filter airflow pathway.

11. The disk drive of claim 1, wherein the drive sub-component is one of a breather filter, a spindle motor, an actuator assembly and a voice coil motor back plate.

12. A disk drive, comprising:
a disk drive housing having a breather hole and a separate leak testing hole, both the breather hole and the leak testing hole being formed through the disk drive housing;
a breather filter configured to limit and filter airflow into the disk drive housing through a filter airflow pathway, the breather filter being attached to a surface of the disk drive housing so as to form an interface between the breather filter and the surface of the housing, the interface defining an interface outer perimeter, the interface further defining, within the interface outer perimeter, a sealed airflow testing channel that is in fluid communication only with the leak testing hole, the breather filter including:
a breather filter housing and a filter fitted within the filter housing, the breather filter housing having a breather filter housing surface that defines a filter housing hole that is in fluid communication with both the filter airflow pathway and the breather hole, the airflow testing channel being defined at least partially within the breather filter housing and at least partially around the filter housing hole;
a carrier layer defining a first carrier layer surface and a second carrier layer surface;
a first adhesive layer coupling the second carrier layer surface to the disk drive housing to form the interface between the breather filter and the disk drive housing, and
a second adhesive layer coupling the breather filter housing surface to the first carrier layer surface, the carrier layer and the first and second adhesive layers defining a portion of the filter airflow pathway.

13. The disk drive of claim 12, wherein the airflow testing channel is at least partially defined within the surface of the housing.

14. The disk drive of claim 13, wherein the disk drive housing includes a base and a cover and wherein the airflow testing channel is at least partially defined within the base.

15. The disk drive of claim 13, wherein the disk drive housing includes a base and a cover and wherein the airflow testing channel is at least partially defined within the cover.

16. The disk drive of claim 12, further comprising at least one fastener attaching the drive sub-component to the surface of the disk drive housing and wherein the airflow testing channel is disposed at least partially around the fastener.

17. The disk drive of claim 16, wherein the fastener includes a screw.

18. The disk drive of claim 12, wherein the airflow testing channel forms a closed pathway around the filter airflow pathway.

* * * * *